United States Patent [19]

Reinicke

[11] 4,299,252
[45] Nov. 10, 1981

[54] PERMANENT MAGNET BOOSTED ELECTROMAGNETIC ACTUATOR

[75] Inventor: Robert H. Reinicke, Mission Viejo, Calif.

[73] Assignee: Consolidated Controls Corporation, El Segundo, Calif.

[21] Appl. No.: 54,857

[22] Filed: Jul. 5, 1979

[51] Int. Cl.³ ............... F16K 11/04; F16K 31/06
[52] U.S. Cl. ..................... 137/625.5; 137/625.65; 251/65; 251/129; 251/139; 335/229
[58] Field of Search .......... 137/596.17, 625.5, 625.65, 137/870; 251/65, 129, 139, 141; 335/229

[56] References Cited

U.S. PATENT DOCUMENTS

| | | | |
|---|---|---|---|
| 2,675,022 | 4/1954 | Bohn | 251/141 X |
| 3,043,336 | 7/1962 | Parent et al. | 137/596.17 X |
| 3,383,084 | 5/1968 | Mayfield | 251/139 X |
| 3,814,376 | 6/1974 | Reinicke | 251/65 |
| 4,157,520 | 6/1979 | Moates | 335/229 X |
| 4,159,026 | 6/1979 | Williamson | 137/625.5 |

FOREIGN PATENT DOCUMENTS 1909360 10/1970 Fed. Rep. of Germany .................. 137/625.65

*Primary Examiner*—Gerald A. Michalsky

*Attorney, Agent, or Firm*—Mason, Kolehmainen, Rathburn & Wyss

[57] ABSTRACT

An armature of magnetizable material is mounted within a magnetic housing by means of a pair of Belleville springs so that the armature is movable along the central axis thereof between opposed pole pieces formed in the housing. A radially magnetized permanent magnet is positioned in the housing concentric with the armature and a single actuator coil is positioned in the housing concentric with one of the pole pieces. The armature is held in engagement with one of the pole pieces by the flux of the permanent magnet. When the coil is energized the armature is moved into engagement with the opposite pole piece against the biasing force of the Belleville springs, in which position one valve element is closed and the other valve element is opened. The armature pole faces and the pole pieces within the housing have a configuration such that when the armature is in the coil energized position the magnetic permeance of the armature with respect to each pole piece is substantially equal. Accordingly, when the coil is deenergized approximately half of the permanent magnet flux is diverted away from the opposite pole piece to permit the Belleville springs to return the armature to its initial position.

14 Claims, 4 Drawing Figures

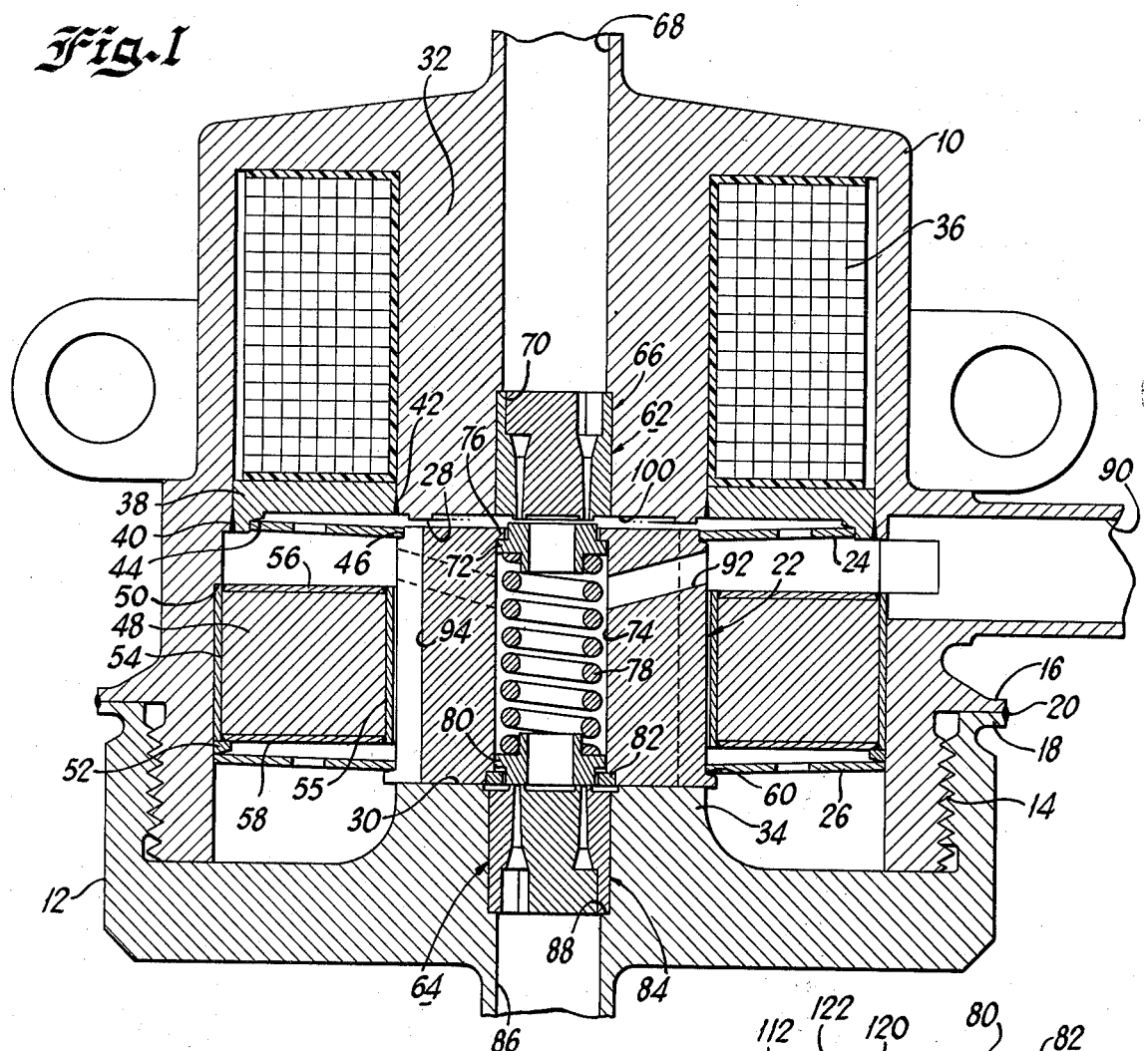
Fig. 1
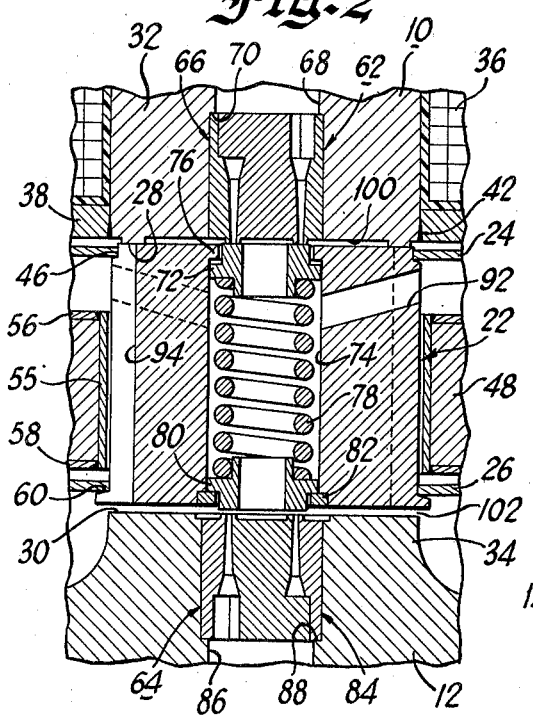
Fig. 2
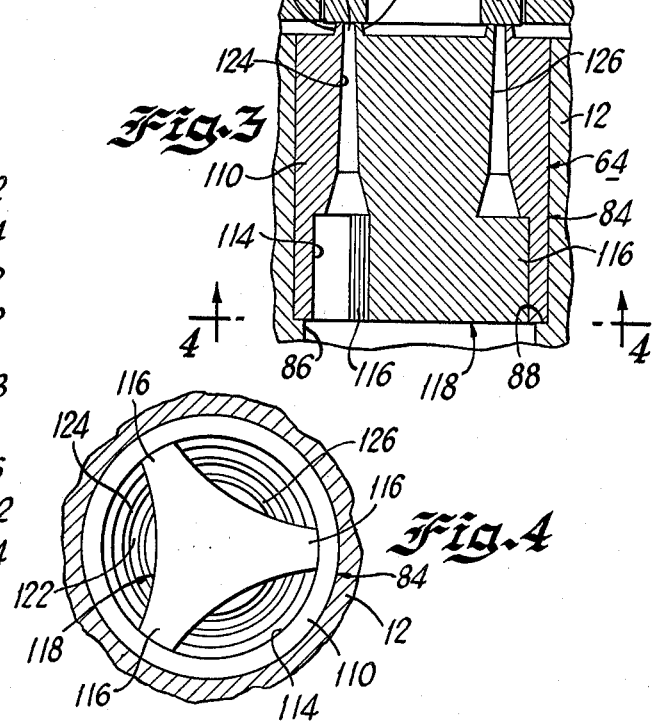
Fig. 3
Fig. 4

PERMANENT MAGNET BOOSTED ELECTROMAGNETIC ACTUATOR

The present invention relates to electromagnetic actuators, and, more particularly, to electromagnetic actuators of the type wherein an armature of magnetizable material is movable between two positions under the combined control of an actuating coil and a permanent magnet. While the invention is of general application it is particularly suitable for use with and will be described in connection with the actuation of valve elements which may be employed, for example, in the control of a propellant for space vehicles, or the like.

Various types of arrangements have been heretofore proposed for actuating a control element such as a movable valve element, under the control of a combination of permanent magnets and actuator coil or coils. Such arrangements are shown, for example, in Reinicke U.S. Pat. No. 3,814,376, Chase Pat. No. 3,022,450, Caldwell Pat. No. 3,178,151, Tillman Pat. No. 3,460,081, Almond et al Pat. No. 2,515,029, Bremner et al Pat. No. 3,203,447, Weinberg Pat. No. 3,379,214, Best Pat. No. 2,579,723, Padula Pat. No. 3,368,788, Conrad Pat. No. 3,040,217, Stampfli Pat. No. 3,458,769, Huntington Pat. No. 3,608,585, Stampfli Pat. No. 3,542,333 and Parsons Pat. No. 2,279,243.

While the arrangements described in these prior art patents are in general satisfactory for their intended purpose, when employed to maintain a valve closed and leak-tight during unusually high boost vibration conditions, such as experienced in the space program, these arrangements exhibit certain deficiencies. For example, many of these arrangements employ dynamic seals, such as bellows, flexure sleeves, O-rings etc. which cause failures due to their inherent vibration, pressure and life cycle sensitivities. Furthermore, many of the relatively fragile torque motor designs, with their flexure sleeved, unbalanced mass design arrangements, are incapable of handling the higher pressure surges and higher vibration levels which are experienced in space applications. In addition, many of these arrangements require considerable power consumption, and are quite bulky and heavy with the result that they are unsuitable for space applications. Also, many of these arrangements employ sliding parts which in many instances introduces the possibility of valve sticking or jamming.

It is, therefore, an object of the present invention to provide a new and improved electromagnetic actuator arrangement wherein the above discussed disadvantages of the prior art arrangements are avoided.

It is another object of the present invention to provide a new and improved electromagnetic actuator which equals or exceeds torque motor performance levels while providing an arrangement which is only slightly more expensive than conventional solenoid arrangements.

It is another object of the present invention to provide a new and improved electromagnetic actuator which has wide margins of operating force in both open and closed positions, even under worst case operating conditions.

It is a further object of the present invention to provide a new and improved electromagnetic actuator which is particularly suitable for actuation of valve elements and maintains the valves closed and leak-tight under unusually high boost vibration conditions.

It is another object of the present invention to provide an electromagnetic actuator for actuating a valve element wherein the valve element is supported for frictionless operation without any sliding parts to eliminate the possibility of valve sticking or jamming.

It is another object of the present invention to provide a new and improved electromagnetic actuator which is compact, lightweight and relatively inexpensive to manufacture.

The foregoing and other objects and advantages of the invention are accomplished in the illustrated embodiment by mounting an armature of magnetizable material within a magnetic housing by means of a pair of Belleville springs so that the armature is movable along the axis thereof and between opposed pole pieces formed in the housing. A radially magnetized permanent magnet is positioned in the housing concentric with the armature and a single actuator coil is positioned in the housing concentric with one of said pole pieces. The Belleville springs bias the armature into engagement with one pole piece when the coil is de-energized, said armature being held in engagement with this pole piece by the permanent magnet flux of the magnet acting on the armature. When the coil is energized, the permanent magnet flux is switched to the opposite pole piece, so that the armature is moved into engagement with the opposite pole piece against the biasing force of the Belleville springs, in which position one valve element is closed and the other valve element is opened. The armature pole faces and the pole pieces within the housing have a configuration such that when the armature is in this "on" position the magnetic permeance of the armature with respect to each of the pole pieces is substantially equal. When the actuating coil is thereafter de-energized, a portion of the magnetic flux of the permanent magnet is diverted back to the opposite pole piece due to the equal permeance of the armature with respect to each pole piece. Under these conditions, the biasing force of the Belleville springs is sufficient to return the armature to its initial position in which position it is thereafter latched by virtue of the flux from the permanent magnet which has now been switched almost entirely to said one pole piece. The permanent magnet flux thus acts to latch the armature in one position and assists the actuating coil in moving the armature to the opposite position. However, when the coil is de-energized, due to the configuration of the pole pieces and armature pole faces a portion of the permanent magnet flux is diverted so that the Belleville springs can provide the force necessary to move the armature back to its initial latched position.

This arrangement is relatively simple and has few parts compared to other high performance, space quality propellant valves.

The invention both as to its organization and method of operation, together with further objects and advantages thereof, will best be understood by reference to the following specification taken in connection with the accompanying drawings in which FIG. 1 is a sectional side elevational view of the electromagnetic actuator and associated valves of the present invention;

FIG. 2 is a fragmentary view similar to FIG. 1 but showing the armature in the coil energized position of the actuator;

FIG. 3 is a fragmentary side elevational view, taken on a somewhat larger scale of one of the poppet valves of the arrangement of FIG. 1, and FIG. 4 is a bottom view of the poppet valve of FIG. 3.

Referring to the drawings, the electromagnetic valve actuator of the present invention is therein illustrated as comprising an upper housing member 10 and a cup-shaped retainer member 12, the members 10 and 12 being provided with cooperating threaded portions 14 so that these members may be interfitted to provide a totally enclosed housing which will withstand extremely high pressures. Preferably, the housing members 10 and 12 are provided with opposed outwardly extending flange portions 16, 18 which provide mating, sealing surfaces when the member 12 is threaded onto the end of the housing member 10, these mating surfaces being preferably sealed by a light melt-down 20 for sealing which can be machined off and re-welded if necessary to facilitate dis-assembly and repair of the actuator.

An armature 22 of magnetizable material is mounted within the housing 10 for frictionless operation without any sliding parts by means of a pair of Belleville spring flexures 24, 26 so that the armature 22 is movable along the central axis of the housing 10 between a pair of opposed pole faces 28 and 30. More particularly, the pole face 28 is formed by the bottom end of a downwardly extending central portion 32 of the upper housing member 10, the bottom pole face 30 being formed as the upper surface of an annular central portion 34 of the threaded retainer member 12.

A single actuating coil 36 is mounted in the upper portion of the housing member 10 and a retainer member 38 of non-magnetic material is positioned between the bottom end of the pole piece portion 32 and the housing 10 after the coil 36 is positioned in the housing, the retainer 38 being secured in place by means of the welds 40 and 42. The outer edge of the upper Belleville spring 24 is seated in a notch 44 formed in the spacer 38 and the inner edge of the Belleville spring 24 is seated in a shoulder 46 formed in the upper end of the armature 22.

A toroidal permanent magnet 48 which is radially polarized is seated against a shoulder 50 formed in the inner wall of the housing member 10, the outer edge of the bottom Belleville spring 26 being in engagement with a shim 52 which is positioned between the Belleville spring 26 and the bottom surface of the magnet 48. Preferably, the magnet 48 is of samarium cobalt, which is much more powerful than other magnetic materials, so that a large flux is generated from this permanent magnet while providing an extremely compact and lightweight actuating arrangement. Samarium cobalt is also preferred as the material for the magnet 48 because it has very good stability and can be pre-charged before assembly into the actuator and does not lose strength as a result of air stabilization. By contrast, alnico magnets, which are used in torque motor valves, must be charged up after they have been finally assembled. Samarium cobalt is also preferred because it is not affected by vibration or conditions which cause other materials to lose their charge. Furthermore, samarium cobalt is easily temperature stabilized to eliminate any irreversible loss during valve service.

When the valve actuator of the present invention is employed to control the flow of propellants such as hydrazine which may attack the magnetic material of the magnet 48, the magnet 48 is preferably encased with members 54 and 55 on the outer and inner edges of the magnet 48, respectively, and the members 56, 58 on the top and bottom of the magnet which are welded together to provide a fully enclosed housing for the magnet 48 and prevent contact between the magnet material and the propellant.

The inner edge of the bottom Belleville spring 26 is seated on a shoulder 60 formed in the bottom edge of the armature 22, the Belleville springs 24, 26 acting to urge the armature against the pole face 30 when the coil 36 is de-energized, as will be described in more detail hereinafter. In accordance with an important aspect of the present invention the armature 22 is employed directly to control the opening and closing of a normally open upper poppet valve indicated generally at 62 and a normally closed lower poppet valve indicated generally at 64. More particularly, a normally open (NO) valve seat assembly 66 is mounted in the central bore 68 formed in the housing member 10 and is seated against a shoulder 70 formed in the bore 68. The cooperating NO poppet valve 72, which is positioned within the central bore 74 formed in the armature 22, is urged into engagement with a lip 76 formed in the upper end of the bore 74 by means of the coil spring 78 which is positioned in the bore 74 and also engages the normally closed (NC) poppet valve 80 which is mounted in the bottom end of the bore 74 and is urged against a retainer 82 secured in the bottom end of the bore 74.

The NC valve seat assembly 84 is mounted in the upper end of the central bore 86 formed in the retainer 12 and is seated on the shoulder 88 formed in the upper end of the bore 86.

In the illustrated embodiment, the material to be controlled, such as a propellant, is introduced through the inlet pipe 90 formed integrally with the upper housing member 10 and communicating with the interior of the housing. A series of radially extending passageways 92 are formed in the armature 22 so as to connect the inlet tube 90 with the central bore 74 of the armature 22. Also, a series of vertically extending grooves 94 are formed in the periphery of the armature 22 to facilitate the flow of fluid between the inlet 90 and either one of the outlets formed by the central bores 68 and 86 in the members 10 and 12, respectively.

Considering now the operation of the electromagnetic valve actuator, when the coil 36 is de-energized the armature 22 is urged against the bottom pole face 30 by the Belleville springs 24, 26. In this position the magnetic flux developed by the permanent magnet 48 goes primarily through the magnetic circuit which includes the lower portion of the housing 10, the retainer 12 and the armature 22, due to the fact that the armature is resting on the pole piece 30 and hence has substantially zero air gap at this pole face whereas a substantial air gap is provided between the top surface of the armature 22 and the upper pole face 28 when the armature is in the position shown in FIG. 1. In this position of the armature 22 the normally closed poppet valve 80 is loaded onto its seat by the poppet biasing spring 78. Propellant pressure supplied through the inlet 90 also loads the NC poppet valve 80 more firmly onto its seat. Accordingly, with the arrangement of the present invention, the NC armature pole magnetic force is substantially more than is needed to maintain the armature-poppet mass positively located during very substantial launch induced vibration and acceleration. Such an arrangement insures that the valve seats will not leak and that the valves will not tend to change position during launch.

When the coil 36 is energized the permanent magnet flux of the magnet 48 is forced to switch from the NC armature pole, i.e., the bottom end of the armature 22 to the NO armature pole, i.e., the upper surface of the armature 22. This generates a net magnetic force in the NO pole direction to overcome the net poppet pressure unbalance loading and the forces of the Belleville springs 24, 26, thus actuating the armature to open the normally closed poppet valve 80 and to close the normally open poppet valve 72, as shown in FIG. 2. It will be understood that energization of the coil 36 does not de-magnetize or on the other hand substantially further magnetize the permanent magnet 48. Instead, the coil simply re-directs or switches the permanent magnet flux from the NC armature pole to the NO armature pole. Accordingly, the actuator of the present invention functions similarly to a torque motor but in a simplified linear-motor fashion.

In accordance with an important aspect of the present invention, the upper pole face 28 formed in the bottom end of the portion 32 of the housing 10, is provided with a central recessed portion 100. When the armature 22 is in the position shown in FIG. 2 and the NO poppet valve 72 is closed, the central recess 100 provides an air gap between the upper surface of the armature 22 and the bottom end of the central pole piece 32, the air gap formed by the recess 100 being substantially equal to the air gap 102 which is formed between the pole piece 30 and the bottom end of the armature 22 when the armature is in the position shown in FIG. 2. Accordingly, when the coil 36 is de-energized approximately one-half of the permanent magnet flux of the permanent magnet 48 switches back to the NC armature pole. This occurs because the magnetic permeance of the NO armature pole is approximately equal to the permeance of the NC armature pole when the armature 22 is in the coil energized position shown in FIG. 2.

When approximately fifty percent of the permanent magnet flux has been switched back to the NC armature pole, the deflected Belleville spring forces are insufficient to overcome the pressure unbalance forces and return the armature 22 to its normal position of FIG. 1, thus opening the NO poppet valve 72 and closing the NC poppet valve 80.

As previously described, the armature 22 remains in the position shown in FIG. 1 by virtue of the permanent magnet flux acting on the NC armature pole which has substantially zero air gap with respect to the pole face 30.

Considering now in more detail the construction of each poppet valve and the valve seat assembly, the NC valve seat assembly 84 is shown on an enlarged scale in FIGS. 3 and 4. Referring to these figures, the valve seat assembly 84 comprises an outer annular seat member 110 the upper edge of which is formed with an upstanding annular lip portion 112 which forms the outer seat of the assembly 84. The member 110 is provided with a central bore portion 114 in the bottom end thereof which is adapted to receive the three equally spaced arms 116 of an inner valve seat member 118. The upper end of the member 118 is formed with an upstanding annular lip portion 120 which forms the inner seat of the valve seat assembly 84, an annular slot type orifice 122 being thus formed by the lip portions 112 and 120 which is sealed by the poppet valve sealing member 80 as shown in FIG. 3. The valve seating action is positive and self-aligning since clearance is provided between the poppet valve 80 and the armature 22. The hard poppet 80 seals against the flat lapped, annular hard seat formed by the assembly 64 and is free to self-align on this seat because the armature 22 overtravels the poppet several thousandths of an inch before engaging the pole face 30. Furthermore, the seat-to-poppet impact loading during shutoff is very low because the mass of the armature 22 is detached from the poppet 80 at the instant of poppet-to-seat contact so as to provide long life characteristics for the valve seat assembly 84. The inner wall 124 of the outer seat member 110 and the cooperating wall 126 of the inner seat member 118 are slightly tapered, as best illustrated in FIG. 3, so that as flow exits the seat annulus 122 fluid is actually flowing out of an annular diffuser of about four degrees total included angles. Such an arrangement has proven to yield exceptionally high flow discharge coefficients in the range of 1.1 to 1.2.

The pressure necessary to unseat each of the poppet valves 72 or 80 in the reverse direction is readily controlled by suitable choice of the installed load of the poppet spring 78. This spring may, for example, be designed so that the pressure needed to unseat the poppet valve in the reverse direction exceeds 900 psi.

Preferably the valve seat assemblies 66 and 84 and the poppet valves 72 and 74 are constructed of tungsten carbide. In construction, the inner seat member 118 is joined and sealed in place within the outer seat member 110 by means of gold alloy brazing. The annular seating surfaces 112, 120 are then diamond lapped after brazing.

While the electromagnetic actuator of the present invention has been described in detail in connection with the above-described poppet valve arrangement, it will be understood that this permanent magnet boosted electromagnetic actuator may be used to actuate other devices such as electrical relays, mechanical latches, or the like, insofar as the present invention is concerned.

While there has been described what is at present considered to be the preferred embodiment of the invention, it will be understood that various modifications may be made therein which are within the true spirit and scope of the invention.

What is claimed as new and desired to be secured by Letters Patent of the United States is:

1. In an electromagnetic actuator, the combination of, a substantially cylindrical housing of magnetic material having a pair of pole pieces positioned in spaced apart relation along the axis thereof, an armature having opposed pole faces, means for supporting said armature within said housing for linear movement along said axis between said pole pieces, an annular radially magnetized permanent magnet positioned in said housing concentric with said armature, a single actuator coil positioned in said housing concentric with one of said pole pieces, said supporting means biasing said armature into engagement with the other of said pole pieces when said coil is de-energized and said armature being held in engagement with said other pole piece by the permanent magnet flux acting on said armature, said permanent magnet flux being switched from the armature pole face adjacent said other pole piece to the armature pole face adjacent said one pole piece when said coil is energized so that said armature is moved into engagement with said one pole piece against the biasing force of said supporting means, said armature pole faces and said pole pieces having a configuration such that when said armature is positioned in engagement with said one pole piece the magnetic permeance of said armature with respect to each of said pole pieces is substantially equal, whereby upon de-energization of said coil a sufficient portion of said permanent magnet flux is switched back to said other armature pole face to permit said biasing force of said supporting means to return said armature into engagement with the other of said pole pieces.

2. The combination of claim 1, wherein said supporting means comprises a pair of Belleville springs in engagement with either end of said armature and positioned relative to said housing so as to develop said biasing force.

3. The combination of claim 2, which includes means defining a pair of annular shoulders in said housing which are spaced apart along said axis for receiving the peripheral portions of said Belleville springs.

4. The combination of claim 2, which includes means defining a shoulder at either end of said armature, said Belleville springs being respectively positioned between one of said shoulders and said housing.

5. The combination of claim 1, which includes a poppet valve mounted in one of said armature pole faces, means defining a valve seat in the pole piece opposite said one armature pole face, and flow passage means through said housing and communicating with said poppet valve and said valve seat.

6. The combination of claim 5, wherein said valve seat comprises means defining an annular slot in said pole piece opposite said one armature pole face, and said flow passage means includes a first passageway through said housing, a second central passageway within said armature and communicating with said poppet valve, and at least one third passageway through said armature and connecting said first and second passageways.

7. The combination of claim 6, which includes an annular chamber within said housing and connecting said first and third passageways.

8. The combination of claim 7, wherein said annular chamber is located between said permanent magnet and said coil.

9. The combination of claim 1, which includes a poppet valve mounted in each of said armature pole faces, means defining a valve seat in each of said pole pieces on which the corresponding one of said poppet valves is seated when said armature is in engagement therewith, flow passage means in each of said pole pieces and communicating with said valve seats, and flow passage means into the interior of said armature and communicating with said poppet valves.

10. The combination of claim 9, which includes a central passageway through said armature, and a spring positioned in said passageway and in engagement with both of said poppet valves for biasing either of said poppet valves against its valve seat.

11. The combination of claim 10, wherein said central passageway is provided with a shoulder at either end thereof against which said spring urges said poppet valves when not in engagement with said valve seats.

12. In an electromagnetic actuator, the combination of, a substantially cylindrical housing of magnetic material having a pair of pole pieces positioned in spaced apart relation along the axis thereof, an armature having opposed pole faces, means for supporting said armature within said housing for linear movement along said axis between said pole pieces, an annular radially magnetized permanent magnet positioned in said housing concentric with said armature, a single actuator coil positioned in said housing concentric with one of said pole pieces, biasing means for urging said armature into engagement with the other of said pole pieces when said coil is de-energized, the flux of said permanent magnet being switched from the armature pole face adjacent said other pole piece to the armature pole face adjacent said one pole piece when said coil is energized so that said armature is moved into engagement with said one pole piece against the force of said biasing means, said armature pole faces and said pole pieces having a configuration such that when said armature is positioned in engagement with said one pole piece the magnetic permeance of said armature with respect to each of said pole pieces is substantially equal, whereby upon de-energization of said coil a sufficient portion of said permanent magnet flux is switched back to said other armature pole face to permit said biasing means to return said armature into engagement with the other of said pole pieces.

13. In an electromagnetic actuator, the combination of, a housing of magnetic material having a pair of pole pieces positioned in spaced apart relation along an axis thereof, an armature having pole faces on opposite ends thereof and movable along said axis between said pole pieces, an annular radially magnetized permanent magnet positioned in said housing and concentric with said axis, a single actuator coil positioned in said housing concentric with said axis, biasing means for urging said armature into engagement with one of said pole pieces when said coil is de-energized, the flux of said permanent magnet being diverted from the armature pole face adjacent said one pole piece to the armature pole face adjacent the other pole piece when said coil is energized so that said armature is moved into engagement with said other pole piece against the force of said biasing means, said armature pole faces and said pole pieces being shaped so that upon de-energization of said coil a sufficient portion of said permanent magnet flux is diverted back to said one pole piece to permit said biasing means to return said armature into engagement with said one pole piece.

14. The combination of claim 13, which includes means defining a valve seat in said one pole piece, a poppet valve mounted in said armature and arranged to engage said valve seat when said armature is positioned in engagement with said one pole piece, and flow passage means through said housing and communicating with said poppet valve and said valve seat.

* * * * *